US012032336B2

(12) United States Patent
Hundzinger et al.

(10) Patent No.: US 12,032,336 B2
(45) Date of Patent: Jul. 9, 2024

(54) MEASURING SYSTEM FOR A PLURALITY OF MECHANICAL HOROLOGICAL MOVEMENTS

(71) Applicant: The Swatch Group Research and Development Ltd, Marin (CH)

(72) Inventors: Alexandre Hundzinger, Neuchâtel (CH); Luca De Rosa, Colombier (CH); Thierry Scordilis, Cormondrèche (CH); Yoann Mosteiro Vazquez, Montmagny (CH); José Lehmann, Bevaix (CH); Giuseppe Zamuner, Chavannes-Renens (CH)

(73) Assignee: The Swatch Group Research and Development Ltd, Marin (CH)

( * ) Notice: Subject to any disclaimer, the term of this patent is extended or adjusted under 35 U.S.C. 154(b) by 840 days.

(21) Appl. No.: 17/061,746

(22) Filed: Oct. 2, 2020

(65) Prior Publication Data

US 2021/0116869 A1 Apr. 22, 2021

(30) Foreign Application Priority Data

Oct. 21, 2019 (EP) .................................... 19204403

(51) Int. Cl.
*G04B 37/00* (2006.01)
*G04B 5/02* (2006.01)
*G04B 47/02* (2006.01)

(52) U.S. Cl.
CPC ........... *G04B 37/0075* (2013.01); *G04B 5/02* (2013.01); *G04B 47/02* (2013.01)

(58) Field of Classification Search
CPC ....... G04B 5/02; G04B 37/0075; G04B 47/02
(Continued)

(56) References Cited

U.S. PATENT DOCUMENTS 2,900,815 A * 8/1959 Dostal .................... G04D 1/063 968/681
3,690,144 A * 9/1972 Bonny .................. G04D 7/002 968/681
(Continued)

FOREIGN PATENT DOCUMENTS

CN 108974556 A * 12/2018 ............... B65D 1/24
CN 108974556 A 12/2018
(Continued)

OTHER PUBLICATIONS

European Search Report for EP 19 20 4403 dated Apr. 8, 2020.
(Continued)

*Primary Examiner* — John Fitzgerald
(74) *Attorney, Agent, or Firm* — Sughrue Mion, PLLC

(57) ABSTRACT

A case configured to receive a plurality of mechanical watch movements in the wound state, each movement being housed inside a compartment, configured to receive and maintain the movement according to a predefined orientation. In this position, the winding buttons of the movements are positioned facing respective microphones which are mounted inside the case. The microphones are configured such that they cancel the noises detected, such that the acoustic measurements of each of the movements are essentially not disturbed by the noises produced by the adjacent movements. Also, a method for testing a plurality of mechanical movements installed in the case, and to a testing system which includes the case. The movements are measured by a plurality of cycles of consecutive and successive measurement periods.

13 Claims, 3 Drawing Sheets

(58) Field of Classification Search
USPC .................................................. 73/1.48, 1.49
See application file for complete search history.

(56) References Cited

U.S. PATENT DOCUMENTS

| | | | | | |
|---|---|---|---|---|---|
| 3,939,689 | A * | 2/1976 | Desarzens | G04D 7/1207 968/770 |
| 4,335,596 | A * | 6/1982 | Greiner | G01R 23/15 368/327 |
| 4,477,505 | A * | 10/1984 | Warnaka | G10K 11/16 181/290 |
| 9,292,000 | B2 * | 3/2016 | Lamarche | G04B 5/00 |
| 9,465,367 | B2 * | 10/2016 | Decoux | G01N 21/87 |
| 11,372,375 | B2 * | 6/2022 | Hundzinger | G04D 7/006 |
| 2018/0348707 | A1 | 12/2018 | Lehmann | |

FOREIGN PATENT DOCUMENTS

| | | | |
|---|---|---|---|
| CN | 113658573 | A * | 11/2021 |
| EP | 3 511 781 | A1 | 7/2019 |

OTHER PUBLICATIONS

Communication dated Aug. 31, 2021, issued by the State Intellectual Property Office of the P.R.C. in application No. 202011130868.5.

* cited by examiner

MEASURING SYSTEM FOR A PLURALITY OF MECHANICAL HOROLOGICAL MOVEMENTS

CROSS REFERENCE TO RELATED APPLICATION

This application claims priority to European Patent Application No. 19204403.0 filed Oct. 21, 2019, the entire contents of which are incorporated herein by reference.

TECHNICAL FIELD OF THE INVENTION

The present invention relates to the field of mechanical watches with manual or automatic winding, and more particularly to systems for testing the mechanical movement of this type of watch.

PRIOR ART

Tests are well known for determining the regularity of running, as well as other parameters characteristic of a mechanical watch movement. The measurements used consist of optical and/or acoustic measurements of the impulses generated by the mechanical oscillator of the movement. The acoustic measurements known to date often use expensive microphones which make this solution not very cost-effective. Moreover, it is difficult to measure a plurality of movements by a plurality of microphones close to one another, due to the mutual disturbance of the acoustic signals detected by these microphones. However, optical measurements have been developed, but the equipment required to implement these methods are relatively complex and also expensive.

SUMMARY OF THE INVENTION

The present invention aims to provide a solution to the aforementioned problems. This purpose is achieved by a measuring case, a measuring system, and by a method according to the accompanying claims.

The invention relates to a case configured so as to receive a plurality of mechanical watch movements in the wound state, each movement being housed inside a compartment, configured so as to receive and maintain the movement according to a predefined orientation. In this position, the winding buttons of the movements are positioned facing respective microphones which are mounted inside the case. The microphones are configured such that they cancel or damp the noises detected, such that the acoustic measurements of each of the movements are essentially not disturbed by the noises produced by the adjacent movements.

The invention further relates to a method for testing a plurality of mechanical movements installed in the case, and to a testing system which includes the case. According to the method, the movements are measured, for example, by a plurality of cycles of consecutive and successive measurement periods.

Other features and advantages of the present invention will appear upon reading the following description given of preferred embodiments, provided as non-limiting examples with reference to the accompanying drawings.

BRIEF DESCRIPTION OF THE FIGURES

The invention will be described in more detail hereinafter using the accompanying drawings, given by way of examples that are in no way limiting, wherein.

DETAILED DESCRIPTION OF THE INVENTION

Figure 1:
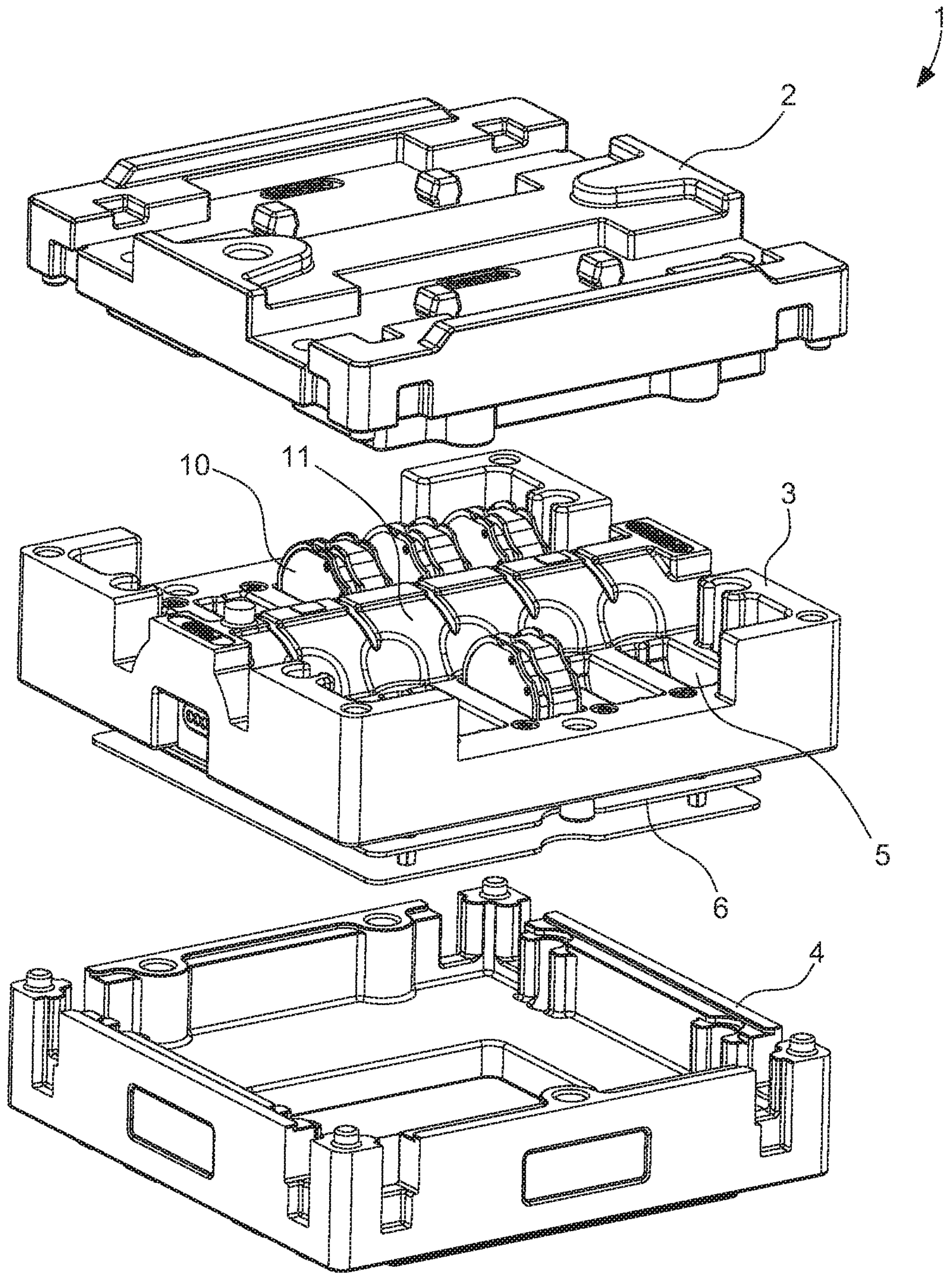
FIG. 1 shows an exploded view of a case for measuring a plurality of movements of mechanical watches, according to one embodiment of the invention.
Figure 2:
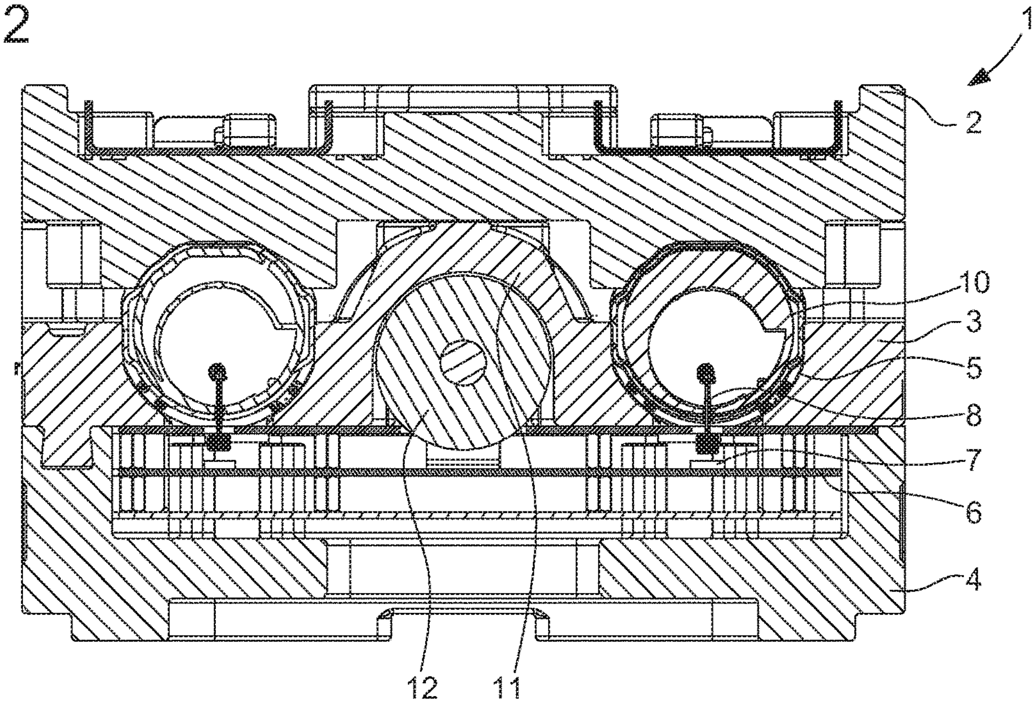
FIG. 2 shows a sectional view of the case in FIG. 1, in the assembled state.

The case 1 shown in FIG. 1 comprises a central part 3, a top cover 2 and a bottom cover 4. The central part 3 comprises a plurality of compartments 5, for example ten compartments configured so as to receive respective watch movements 10. In the embodiment shown, the movements are mounted in plastic containers well known per se as a means for protecting and handling the movements. The container surrounds the movement, leaving the winding button of the movement free. Preferably, the compartments 5 are sized so as to receive movements with the container or watch heads (watch case with the movement but without the bracelet). The movements 10 are housed inside the compartments in a predefined orientation, with the winding button 8 of the movements oriented downwards. This can be seen in FIG. 2, which shows a vertical sectional view of the assembled case 1.

The central part 3 of the case 1 further comprises a PCB 6 (printed circuit board, the board whereof is made of synthetic material), mounted beneath the compartments 5. The PCB 6 is provided with microphones 7, where a microphone 7 is disposed beneath each compartment 5. The microphones 7 are connected to conductive tracks (not shown) of the PCB in order to transmit electrical signals which are representative of the acoustic noises detected by the microphones 7. Each microphone 7 is positioned as a function of the compartment 5 thereof, such that the winding button 8 of the movement 10 housed inside the compartment 5 is facing the dedicated microphone 7 thereof.

The microphones 7 are configured so as to record the noises generated by the mechanical oscillator of the respective movements 10. In a manner known per se, these noises consist of an alternating sequence of two types of impulses of different character, often referred to as 'tick' and 'tock'. Analysing the impulses allows parameters characterising the operation of the movement to be measured, such as the running state and the beat.

Preferably, the microphones 7 are contact microphones comprising a piezoelectric element. The correct recording of the 'tick' and 'tock' impulses thus requires the winding buttons 8 of the movements to be mounted in physical contact with the piezoelectric elements of the microphones 7 or with a contact piece onto which the piezoelectric element is fastened.

The central part 3 of the case 1 further comprises a central compartment 11 configured so as to receive a battery 12, preferably a rechargeable battery, which acts as a power source for the components mounted on the PCB. Instead of a battery, a conventional power supply capable of being connected to the mains can be used.

Figure 3:
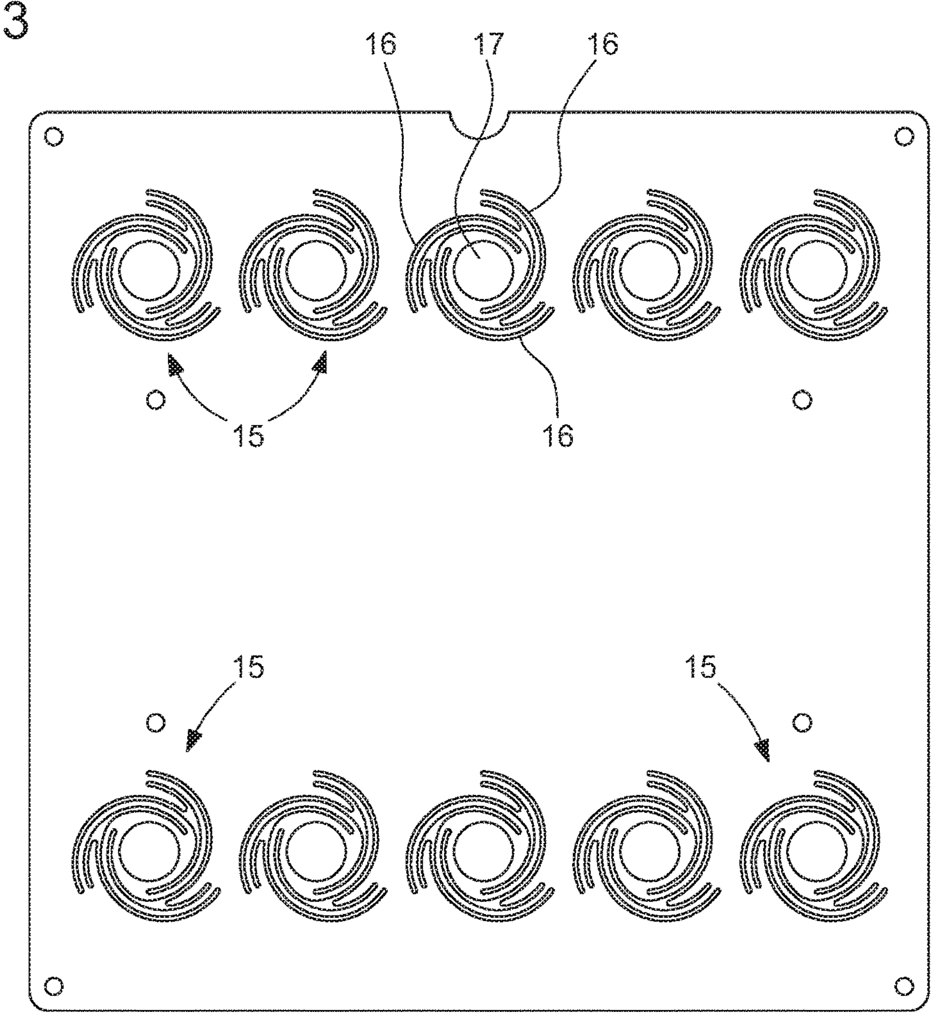
FIG. 3 shows a view of a PCB that can be used in the case according to a preferred embodiment.

According to the invention, the case 1 is configured such that the acoustic measurements recorded by one of the microphones 7 are essentially not disturbed by the impulses (ticks and tocks) of the movements other than the movement housed in the compartment facing the microphone in question. For this purpose, the microphones 7 are provided with means for cancelling the measured noise to prevent this noise from propagating inside the case 1. According to a preferred embodiment, the microphones are contact microphones comprising a piezoelectric element and a spiral-shaped noise-cancelling structure arranged in the material of the PCB, the piezoelectric element being fastened to the spiral-shaped structure. FIG. 3 shows a PCB of this type, without the piezoelectric elements and without the other components and conductive tracks to be subsequently produced on the PCB. The spiral-shaped structures 15 are obtained by cutting three curved sections 16 out of the PCB material around a central hole 17. Preferably, the diameter of the holes 17 corresponds to the diameter of the piezoelectric elements, which will be fixedly mounted inside the holes 17 and connected to the conductive tracks of the PCB. The spiral 15 cancels or damp sound by uncoupling the piezoelectric element from the uniform surface of the PCB 6 (this uniform surface being the surface outside of the spiral-shaped structures 15). The advantage of this type of microphone is that it can be produced at a low cost, while carrying out the measurements of a plurality of movements independently from one another. Other noise-cancelling structures are possible. In general, the noise-cancelling structure establishes a mechanical noise-cancelling link between the piezoelectric element and a uniform portion of the board or card. For example, another structure that can be used is a membrane mounted between the piezoelectric element and the edge of a hole in the PCB, the diameter whereof is greater than the diameter of the piezoelectric element.

The case 1 is also configured so as to insulate the microphones 7 from noises that originate from outside the case 1 when the case is installed in a test environment. The insulation of the microphones 7 relative to the noises from outside the case is procured by an appropriate construction of the case itself, and in particular by wisely choosing the material used for the case 1. The construction represented in the figures, consisting of two thick covers 2 and 4, mounted on either side of the central part 3 containing the movements and according to which the parts 2, 3, 4 are made of an acoustically insulating material, such as an EPP (Expanded Polypropylene) foam is capable of procuring the insulation from external noises.

The invention further relates to a method for testing the movements 10 installed in the case 1 on the basis of the signals generated by the microphones 7. The method involves recording, at regular intervals, the values of a number of parameters characterising the operation of the movements 10, during part or all of the power reserve of the movements, which can be equal to about 72 h. The method is illustrated by way of a diagram in FIG. 4, which shows the case whereby the case 1 contains, for example, ten movements 10 to be tested. According to an alternative embodiment of the method, a sequence of consecutive signal acquisition and processing periods can be carried out, the periods corresponding to a consecutive sequence of movements installed inside the case. In other words, during the first period P1, the signals generated by the first microphone (which measures the first movement) are acquired. During the second period P2, the signals generated by the second microphone are acquired, and so forth as far as the $10^{th}$ microphone. The periods P1 to P10 follow on from one another in a continuous manner and each period has the same duration, for example ten or several tens of seconds. At the end of the sequence of the 10 movements, the sequence starts over from the first movement. This cycle is continuously repeated, for a certain time, at most until the end of the power reserve of the movements.

It should also be noted that the sequential measurement of one movement after another movement is a version that minimises diaphony and consumption. However, depending on the quality of the materials used to make the case, the external environment, and the reliability of the measurement and of the algorithm, it is entirely possible to procure a simultaneous acquisition of two or more movements during one measurement period. The different measurements are taken, for example, for two movements disposed opposite one another, or even for one movement in every two during a first measurement period interval, and for the remaining 50% of the movements during a second measurement period interval. A rolling measurement can also be carried out between each movement. In this scenario, the acquisition of the first movement starts by itself, then, after a certain time, the measurement of the first movement continues, while the measurement of the following movement starts, then the measurement of the first movement stops once the measurement time has elapsed, and the measurement continues solely with the second, then the measurement of the third starts, and so forth.

Figure 4:
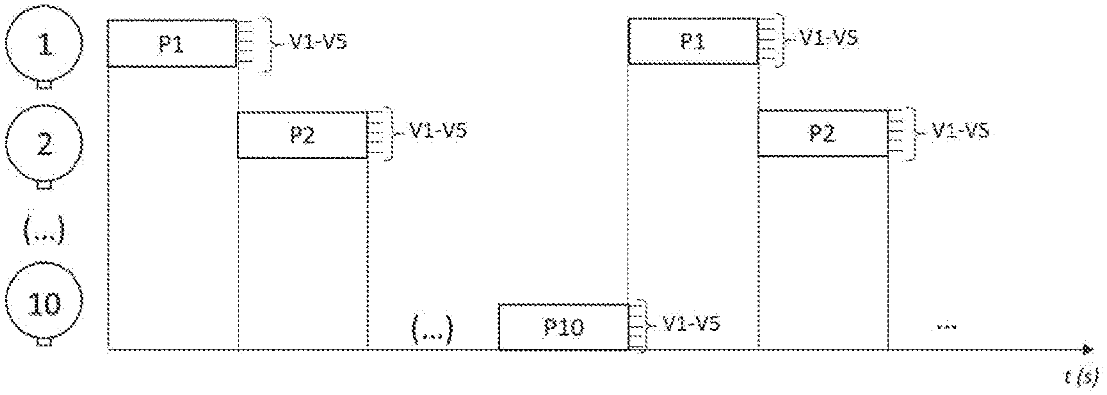
FIG. 4 shows a diagram of the measurement sequence carried out according to the method of the invention.
Figure 5:
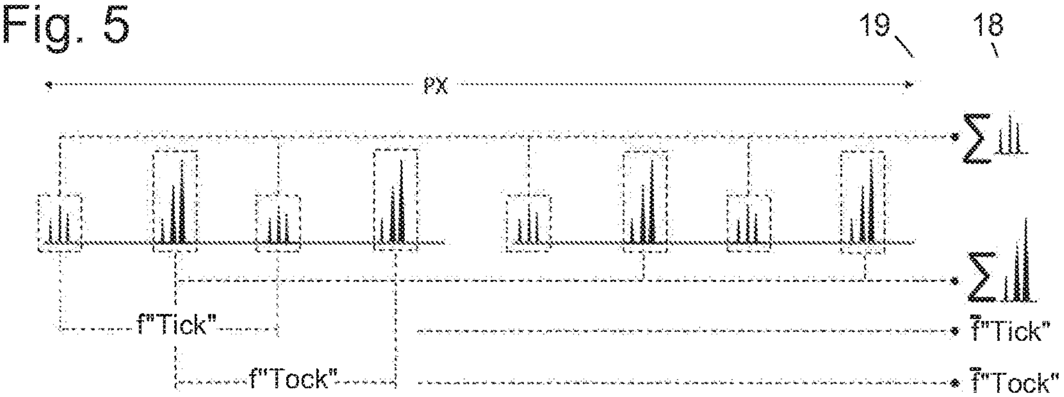
FIG. 5 shows a view of the signal measured by one of the microphones installed in a case according to the invention.

FIG. 5 shows a diagrammatic view of the signal measured by one of the microphones 7 during one of the periods PX. The 'tick' and 'tock' impulses are shown. In a manner known per se, each impulse consist of a sequence of peaks linked to phenomena that characterise the escapement inside the movement. As is also well known in the prior art, analysing impulses allows the value of a number of digital parameters characterising the operation of the movement to be calculated, such as the frequency of the 'ticks' and 'tocks', the running state (gain or loss of the movement relative to a reference oscillation), the beat (offset between the tick and tock frequencies), the amplitude of the movements (the angle between the position of equilibrium and the return point of the balance) and the type of escapement (Swiss lever escapement or coaxial escapement). According to the method of the invention, the values of one or more of these parameters are recorded at the end of the periods PX, for each of the movements 10 installed inside the case. According to the embodiment shown in FIG. 4, five values V1 to V5 are recorded in this manner, for example the values of the five parameters identified hereinabove (frequency, running state, etc.). The values can be identified instantaneously at the end of the period PX. For certain parameters, the values can also be calculated based on the signals detected during the entire period. For example, and as shown in FIG. 5, the frequencies can be calculated as averages $\bar{f}_{tick}$ and $\bar{f}_{tock}$ of the instantaneous frequencies $f_{tick}$ and $f_{tock}$ determined based on the time between two impulses of the same type (tick or tock).

One specific embodiment of the method, also shown in FIG. 5, includes calculating the value of the amplitude of the movements, based on the sum 18 of the 'tick' impulses and the sum 19 of the 'tock' impulses detected by the microphone 7 over the full duration of the period PX. It has been seen that the sum of the impulses allows the individual peaks forming a part of each of the impulses to be better identified, and thus improves the accuracy of the calculation of the amplitude of the movement.

According to preferred embodiments, the case 1 is provided with means for processing the signals and means for recording the parameter values according to the diagrams shown in FIGS. 4 and 5, in addition to means for communicating the results outside of the case 1, such as a screen. The case can further be provided with a number of sensors for measuring the conditions inside the case, such as the temperature, humidity, accelerations and the magnetic field. At least some sensors are mounted on the printed circuit board and form a part of the PCB.

Figure 6:
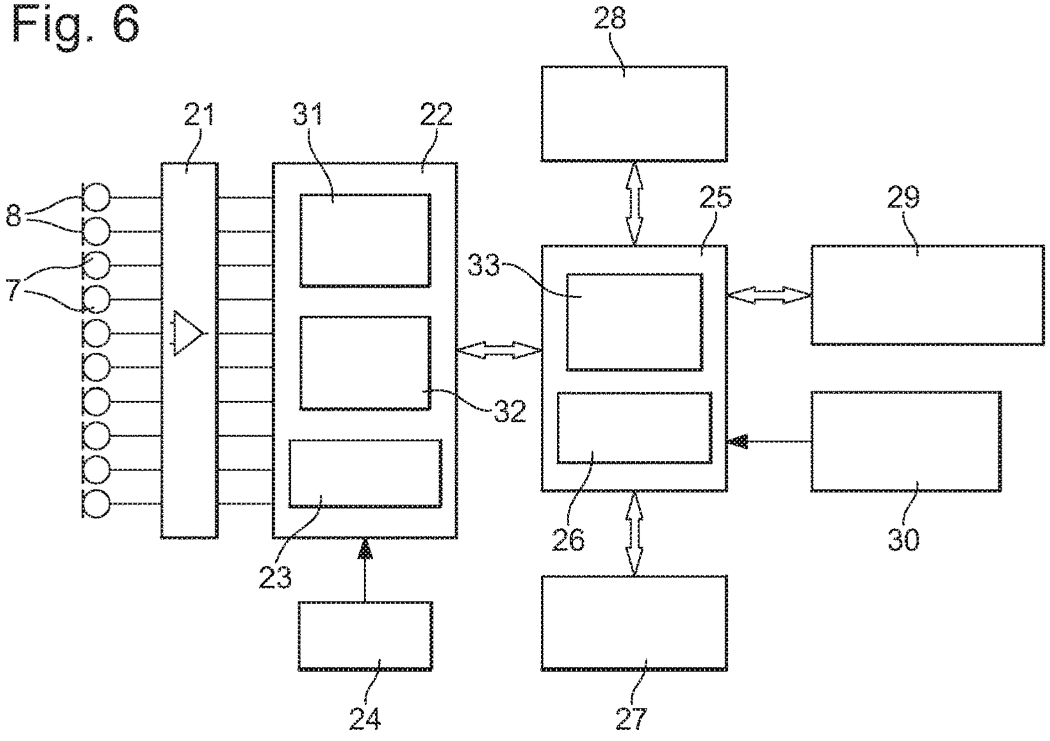
FIG. 6 shows a diagram of the components mounted on the PCB of the case, according to one embodiment of the invention.

FIG. 6 shows one example of a diagram of the PCB applicable in a case 1 according to a preferred embodiment. The winding buttons 8 and the microphones 7 are shown. The signals generated by the microphones 7 pass via an amplification stage 21 to a first processing unit 22 which includes an analogue-to-digital converter (ADC) 31, a microprocessor 32 or damp timed by an accurate oscillator 24 (preferably of the TCXO—Temperature Compensated Crystal Oscillator type) connected on the input side to each microphone in order to receive the signals from each mechanical movement to be tested, and a memory 23. The oscillator 24 provides the reference frequency relative to which the running of the movements is determined. The method of the invention is implemented in the processing unit 22. In other words, the processor 32 of the processing unit 22 is programmed to acquire the signals from the movements in a consecutive manner, to calculate the values at the end of each measurement period PX, for all of the movements installed in the case, and to record these values in the memory 23. The first processing unit 22 is connected to a second processing unit 25 comprising a memory 26 and a microprocessor 33. The second unit 25 is connected to a number of other components mounted on the PCB: a power management unit 30 connected to the battery, a sensor unit 27 which receives the data measured by other sensors (temperature, humidity or other data) inside the case 1, a user interface 28 (preferably a screen), and a communication unit 29 to manage the communication of the values measured to devices outside the case such as a server connected to the case via a wireless digital network. According to an alternative embodiment, a single processing unit is provided, grouping the ADC, a memory and a single microprocessor which implements the method of the invention, the single processing unit further being connected to the other components of the PCB.

According to a preferred embodiment, certain components operate in a non-continuous mode, being woken up at intervals, at the times at which data is sent outside the case 1. This operating mode minimises power consumption.

The case 1 itself can be considered such that it may not comprise means for processing the signals from the microphones. It is thus configured so as to form a part of a testing system comprising the case 1 and a computer connected to the case. The method of the invention is thus implemented in the computer in the form of a set of electrical and/or microelectronic components which process the signals generated by the microphones 7 so as to obtain and record the values at the end of each measurement period PX.

What is claimed is:

1. A case for testing a plurality of mechanical horological movements, each movement being provided with a winding button, the case comprising:

a plurality of compartments, each compartment being configured so as to receive a movement, such that the movement is housed inside the compartment according to a predefined orientation, a plurality of microphones equal in number to the number of compartments, the microphones being mounted such that the winding buttons of the movements are located facing the respective microphones when the movements are housed inside the compartments according to said predefined orientation, wherein each microphone is provided with a noise-cancelling structure, such that disturbance of the acoustic measurements of each of the movements is minimized by noises produced by the adjacent movements, and wherein the case further comprises a PCB mounted beneath the compartments and including a board made of synthetic material, and wherein the microphones are mounted on or integrated into the board of the PCB.

2. The case according to claim 1, further comprising one or more sensors for measuring the conditions inside the case.

3. The case according to claim 1, the case including three parts: a central part comprising the compartments, a top cover and a bottom cover.

4. The case according to claim 3, wherein the three parts are made of an acoustically insulating material.

5. The case according to claim 1, wherein:

the microphones are contact microphones comprising a piezoelectric element, the winding buttons of the movements are placed in physical contact with the piezoelectric elements of the microphones when the movements re housed inside the compartments according to said predefined orientation, the noise-cancelling structure establishes a mechanical noise-cancelling link between the piezoelectric element and a uniform portion of the board of the PCB.

6. The case according to claim 5, wherein the PCB further comprises one or more units for processing the signals generated by the microphones.

7. The case according to claim 5, wherein the noise-cancelling structure is a membrane mounted between the piezoelectric element and the edge of a hole in the PCB, the diameter whereof is greater than the diameter of the piezoelectric element.

8. The case according to claim 5, wherein the noise-cancelling structure is a spiral-shaped structure arranged in the synthetic material of the board of the PCB.

9. The case according to claim 8, wherein the board of the PCB is provided with holes, the piezoelectric elements being fastened inside the holes, and wherein the spiral-shaped structures extend around said holes.

10. A system for testing a plurality of mechanical horological movements, each movement being provided with the winding button thereof, the system comprising a case according to claim 1.

11. A method for testing a plurality of mechanical horological movements installed in the wound state inside a case according to claim 1, the method:

comprising the acquisition of the signals generated by the microphones configured so as to measure the noise of 'tick' and 'tock' impulses generated by the plurality of movements, the acquisition being carried out consecutively for the plurality of movements, by a cycle of consecutive measurement periods, following on from one another and equal in length, the cycle being repeated once or several times, being configured such that at least one parameter characterising the operation of the movement tested is recorded at the end of each measurement period.

12. The method according to claim 11, wherein the at least one parameter recorded comprise one or more of the following:

a frequency of the 'tick' impulses and a frequency of the 'tock' impulses, a running state, a beat, and an amplitude of the movements.

13. The method according to claim 12 comprising the recording of the amplitude of the movements, and wherein the calculation of the amplitude is based on the sum of the signals linked to the 'tick' impulses and on the sum of the signals linked to the 'tock' impulses, during a measurement period.

* * * * *